United States Patent
Klaschka

[11] Patent Number: 5,936,574
[45] Date of Patent: Aug. 10, 1999

[54] DEVICE FOR MONITORING THE DISTANCE BETWEEN TWO OBJECTS

[76] Inventor: Rüdiger Klaschka, Am Lindenberg 10, D-Z1263 Weil der Stadt, Germany

[21] Appl. No.: 08/913,948
[22] PCT Filed: Jan. 20, 1997
[86] PCT No.: PCT/EP97/00234
§ 371 Date: Nov. 12, 1997
§ 102(e) Date: Nov. 12, 1997
[87] PCT Pub. No.: WO97/26552
PCT Pub. Date: Jul. 24, 1997
[51] Int. Cl.⁶ .............................. G01S 5/02; H04B 7/185
[52] U.S. Cl. .............................. 342/357.06; 342/357.08; 342/458; 701/213
[58] Field of Search ..................... 342/357, 457, 342/456, 455, 29, 32, 47, 109, 118, 458; 701/213, 120

[56] References Cited

U.S. PATENT DOCUMENTS 5,493,309  2/1996  Bjornholt ........................ 342/455

FOREIGN PATENT DOCUMENTS 9301576  1/1993  WIPO .

Primary Examiner—Gregory C. Issing
Assistant Examiner—Dao L. Phan

[57] ABSTRACT

A device for monitoring the distance between two objects, at least one of which is a moving object having transmission units carried by the two objects and receiving units carried at least by moving object, the transmission units transmitting position data signals for carrying object and an identification signal associated with the carrying object, and the receiving unit receiving the position data signals and object identification signals of other object, wherein the moving object carries a GPS unit which supplies the position data signals; wherein the transmission units and the receiving unit operate in the VHF range and each comprise an antenna with a substantially spherical operating characteristic; and wherein the transmission units have identical transmitting power and the receiving units are connected to a discriminator circuit which rejects received signals of an amplitude below a preset threshold value, and at least the moving object carries a monitoring computer which, from the position data signals of the moving object and the received position data signals of the other object, calculates the distance between the two objects.

6 Claims, 7 Drawing Sheets

DEVICE FOR MONITORING THE DISTANCE BETWEEN TWO OBJECTS

CROSS-REFERENCE TO RELEVANT APPLICATIONS

Not applicable.

STATEMENT REGARDING FEDERALLY SPONSORED RESEARCH OR DEVELOPMENT

Not applicable.

The invention relates to a device for monitoring the distance between two objects according to and more particularly to a device for monitoring the distance between two objects, at least one of which is moving and carries transmission units and receiving units.

DISCUSSION OF RELEVANT ART

Such devices are known in connection with monitoring the distance between two aircraft and are sold by the company, Honeywell, under the name of TCAS (traffic alert and collision avoidance system). Said known device makes use of the standard radar equipment of the aircraft, the position data of the various aircraft being communicated by their transponders to the radar ground station and from there together with other data to all other aircraft flying in the same air space.

A similar device is sold by the company Ryan, under the name of TCAD (traffic/collision alert device). Said known device receives and decodes transponder signals and displays the air traffic in the relevant air space in the form of character strings on a small display unit. In said system too, however, use is made of the standard radar transponder signals.

Although radar air monitoring is an excellent aid for traffic zones at greater altitudes, it is precisely at low flying heights, where the risk of aircraft coming dangerously close to one another is particularly high, that radar monitoring and the transfer of data transmitted together with radar signals is less satisfactory.

SUMMARY OF THE INVENTION

The object of the present invention is a device for monitoring the distance between two objects, at least one of which is moving, wherein the object distance is determined independently of radar signals.

This object is achieved by the present invention, as follows

A device for monitoring the distance between two objects, at least one of which is a moving object having transmission units carried by the two objects and a receiving a unit carried at least by moving object, the transmission units transmitting position data signals for carrying object, and an identification signal associated with the carrying object, and the receiving unit receiving the position data signals and object identification signals of other object, wherein the moving object carries a GPS unit which supplies the position data signals; wherein the transmission units and the receiving unit operate in the VHF range and each comprise an antenna with a substantially spherical operating characteristic; and wherein the transmission units have identical transmitting power and the receiving units are connected to a discriminator circuit which rejects received signals of an amplitude below a preset threshold value, and at least the moving object carries monitoring computers which, from the position data signals of the moving object and the received position data signals of the other object, calculates the distance between the two objects.

In the case of the monitoring device according to the invention, the objects which are to monitored for dangerous proximity continuously transmit position data signals and object identification signals in the VHF range. Transmission of said signals is effected substantially with an spherical characteristic. The receiving units which are used likewise operate with a spherical characteristic. Each of the moving objects carries a monitoring computer which calculates the instantaneous object distance from the received position data signals and its own position data signals. The position data signals in the case of moving objects are generated in each case by a GPS unit (GPS=Global Positioning System), i.e. are based on a standard determination using the output signals of a plurality of navigation satellites disposed in space. The location determination thus obtained is very precise. The GPS units have meantime become available at low cost.

A further advantage of the invention is that GPS position determination and also VHF position data transmission operate well not only at high altitudes but also close to the earth's surface. Thus, with the device according to the invention it is possible to monitor dangerous approaches of aircraft both in the vicinity and on the earth's surface.

The device according to the invention may however also be used to avoid collisions of ships and land vehicles.

Finally, the invention may also be used to monitor the approach of moving objects to stationary obstacles. To said end, the stationary obstacles are provided with memories containing the position data signals and object identification signals, and the corresponding data are continuously read out and transmitted from said memory, in the same way as for moving objects. In said manner, tall buildings, mountains or the like may be integrated at very low cost into the safety monitoring of the course of aircraft. In the field of navigation, correspondingly equipped radio buoys may prevent ships from coming dangerously close to shallows.

Owing to the high resolution of the GPS position data, use of the invention is also practicable in connection with land vehicles (e.g. early detection of drivers travelling in the wrong direction along expressways).

When, according to an advantageous feature of the invention, not only the position data of the objects but also their course data (direction of movement and speed of movement) are transmitted, it is possible after receiving only a single path data record to arrive at a good estimation of the future movement of the object to be monitored.

The development of the invention is advantageous in view of the avoidance of overlaps in the path data signals transmitted on a shared VHF channel.

In said case, with the development of the invention the risk of two objects using the same transmission time slice simultaneously is reduced in a simple manner because allocation of the various radio channels, on which the radiotelephone traffic for the various objects (aircraft) occurs, is effected by the flight monitoring system likewise in such a way as to prevent double occupancy of channels.

The development of the invention also serves to avoid overlaps in the position data records transmitted by the various objects.

In the case of a device according to the invention, the person directing the moving object is issued not only with a warning but also immediately with a change-of-course proposal which takes due account of the rules of avoidance of aviation and navigation and enables the person directing the vehicle to react quickly and correctly in the given hazardous situation.

In the case of two moving objects, the development of the invention according to the invention makes it possible to get into radio contact quickly with the person directing the other object in order to reach agreement about the avoidance course to be adopted in each case.

BRIEF DESCRIPTION OF THE DRAWINGS

There follows a detailed description of embodiments of the invention with reference to the drawings. The drawings show.

DETAILED DESCRIPTION OF PREFERRED EMBODIMENTS

Figure 1:
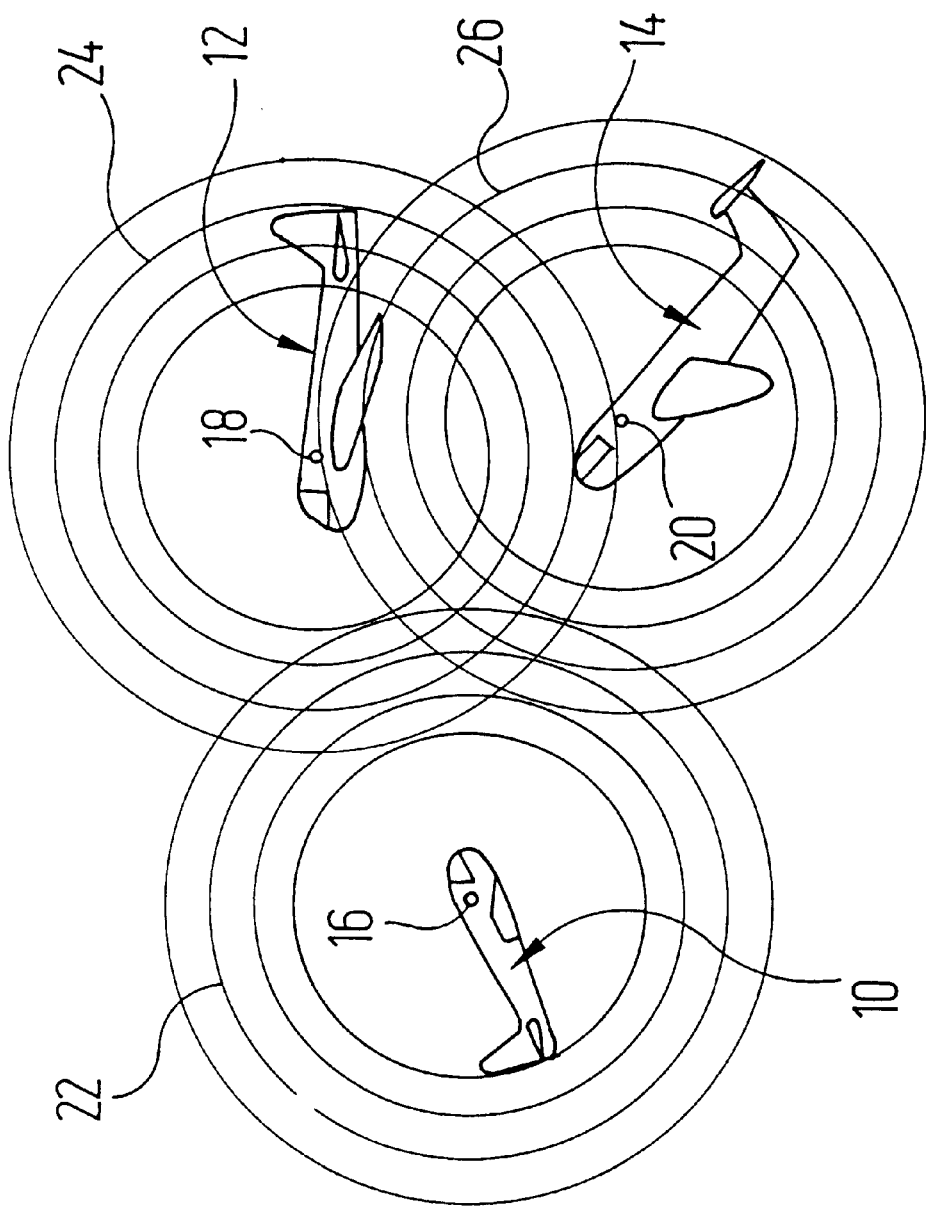
FIG. 1: a diagrammatic view of the distance monitoring between aircraft flying in a common traffic zone.

FIG. 1 shows three aircraft 10, 12, 14 which are moving on different courses through an air space. The aircraft 10, 12, 14 have distance-monitoring units 16, 18, 20 which, on the one hand, continuously transmit on a VHF frequency (indicated, for example, by wave fronts 22, 24, 26) object data containing information about the identity of the aircraft, its model, its position and its course. Conversely, the monitoring units 16, 18, 20 on the shared VHF frequency receive object data from the other aircraft situated in the air space in question.

As will be explained in greater detail below, the object data in particular comprise the location of the object, the height of the object above mean sea level, the direction in which the object is moving, the speed at which the object is moving, the time of transmission of the object data by the object, an object identification code, details of the type of object and the VHF channel on which radiotelephone communication with the object is handled.

As will be explained in greater detail below, the monitoring units of the various aircraft on the basis of their own position and course and the positions and courses of the other aircraft determine whether there is a risk of coming dangerously close to another aircraft.

Figure 2:
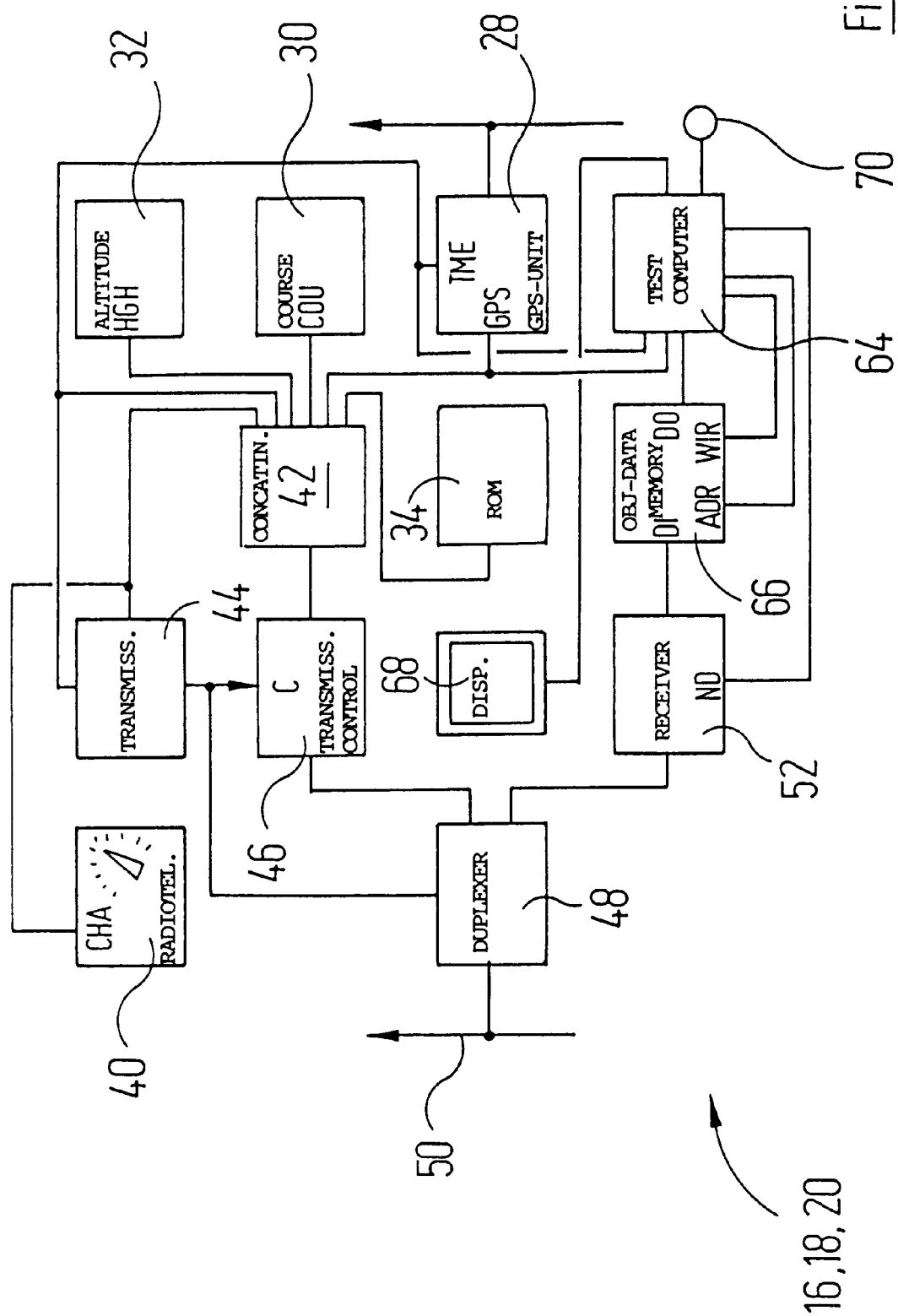
FIG. 2: a block diagram of a monitoring unit of the type carried by each of the aircraft shown in FIG. 1.

FIG. 2 shows details of the structure of one of the monitoring units 16, 18, 20.

The monitoring units 16, 18, 20 each comprise a GPS unit 28, which at a first output "GPS" supplies the position coordinates of the aircraft such as result from the delay comparison of standard time signals which are emitted by various navigation satellites at fixed points in space. At a further output TME, the GPS unit 28 supplies a highly accurate real-time signal.

Each monitoring unit further comprises a course sensor 30 which supplies a digital course signal COU corresponding to the course instantaneously adopted by the aircraft. Said signal may be derived, for example, from the gyro compass installed in the aircraft.

Each monitoring unit further comprises an altitude sensor 32 which supplies an altitude signal HGH associated with the flying height of the aircraft. Said signal is again a digital signal and is supplied by a suitably equipped altimeter of the aircraft.

The registration number and type of the aircraft in question are programmed in a read-only memory 34.

A VHF radiotelephone device 40 of the aircraft supplies a digital output signal corresponding to the tuned VHF channel. For said purpose, the radiotelephone device 40 is equipped with a channel output CHA, which is connected to the output of a digital position indicator coupled to the channel selector.

A concatenation circuit 42 combines the various character strings, which are supplied by the GPS unit 28, the course sensor 30, the altitude sensor 32, the read-only memory 34 and the radiotelephone device 40, into a single character string which has separators inserted between the individual character strings and a header character string placed at the front. The character string thereby obtained is passed to a transmission circuit 44.

Operation of the transmission circuit 44 is controlled by a transmission control circuit 46. The latter receives, at a first input, the time output signal TME of the GPS unit 28 and, at a second output, the channel identification signal CHA supplied by the radiotelephone device 40. Using the latter signal, the transmission control circuit 46 defines a transmission time window dependent on the tuned radiotelephone channel. Within said transmission time window the transmission control circuit 46 is activated and then converts the character string delivered to it into serial representation, modulates with said character string a VHF signal of a preset standard power and communicates said modulated VHF signal to a duplexer 48, the output of which is connected to an antenna 50. Operation of the duplexer 48 is once again controlled by the output signal of the transmission control circuit 46.

Alternatively, allocation of the transmission time slice may be effected in dependence upon the registration number of the object in question, and in a further modification allocation may be effected both in dependence (or partial dependence) upon the tuned VHF channel and upon the registration number.

In periods when there is no output signal of the transmission control circuit 46, the duplexer 48 connects the antenna 50 to a receiving circuit 52.

The antenna 50 has a directional pattern which is approximately spherical.

Figure 4:
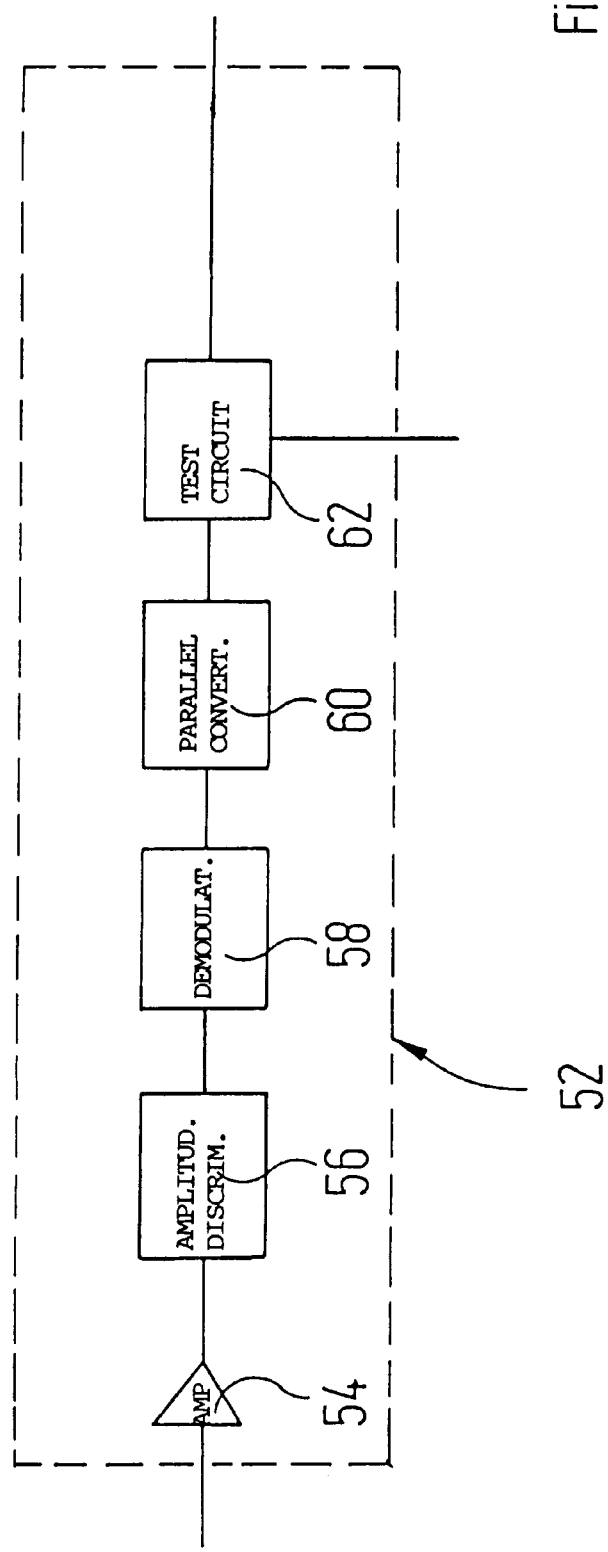
FIG. 4: a block diagram of a data test circuit of the monitoring unit reproduced in FIG. 2.

As is evident from FIG. 4, the receiving circuit 52 comprises an input amplifier 54. Its output is connected to the input of an amplitude discriminator 56 which allows through to its output only signals of an amplitude greater than a preset threshold value. Said threshold value is so selected that signals received from other aircraft which are situated further away than a preset distance of, for example, 60 miles are suppressed. To guarantee such a direct association between signal strength and aircraft distance, the transmission circuits 44 of all of the monitoring units carried by the various aircraft—as already mentioned—have identical standard transmitting power, and the antennae 50—used both for transmitting and receiving purposes—of the various monitoring units have an operating characteristic as close as possible to the spherical characteristic.

The signals, which pass through to the output of the amplitude discriminator 56 and hence correspond to aircraft which are situated in preset closer proximity to the aircraft in question, are supplied to a demodulator 58. The latter converts the incoming VHF signals again into serial data signals.

Connected to the output of the demodulator 58 is a serial-parallel converter 60. Its output therefore receives a character string which comprises the location, course, flying height, identification number and model as well as the radiotelephone channel of another aircraft situated in the vicinity and also the precise instant of transmission of said data. The output of the converter 60 is connected to the input of a test circuit 62. The latter checks whether the received character string is complete or defective. Defective character strings may arise, for example, as a result of faulty signal transmission and/or overlapping of data records, which may arise as a result of the radiotelephone devices 40 of two aircraft inadvertently operating on the same frequency.

Fault recognition may be effected with the aid of plausibility analysis (e,g. comparison of the transmitted aircraft type with a list of all aircraft types) or with the aid of check bits which, at the transmitting end, are calculated according to a preset algorithm from the character string to be transmitted and added to the character string so that, at the receiving end, the transmitted check bits may be compared with comparison check bits which are calculated there according to the same algorithm.

At an output ND the test circuit 62 or the receiving circuit 52 supplies a signal whenever the circuit contains a finished data record. It is possible from the nature of said output signal to recognize whether the data record is free from defects or defective, the signal also allowing recognition of the type of fault. Said signal ND is relayed to a control input of a test computer 64.

The test computer 64 decides whether the received data record is to be rejected or utilized further. In the case of the latter, the test computer 64 activates a write/read control terminal W/R of an object data memory 66. The data input terminal DI of the latter is connected to the output of the test circuit 62.

By suitable control of the write/read control terminal W/R the test computer 64 may accept data from the data output terminal DO of the object data memory 66.

The test computer 64 applies in each case a signal, which is characteristic of the memory location to be selected for writing and/or reading, to an addressing terminal ADR of the object data memory 66.

Further data inputs of the test computer 64 are connected to the outputs of the GPS unit 28.

Figure 5:
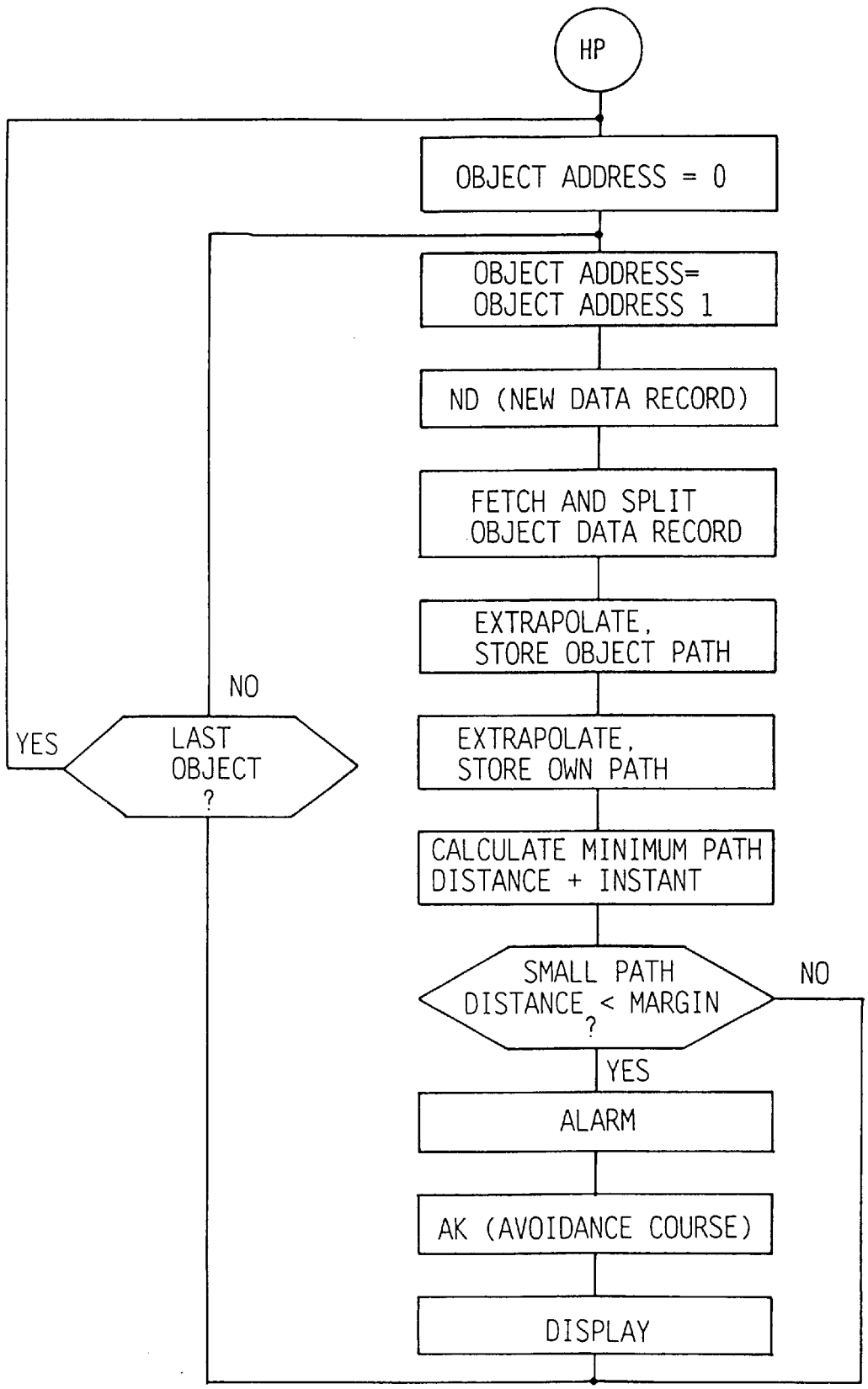
FIG. 5: a flowchart of a main program, according to which a monitoring computer of the monitoring unit according to FIG. 2 operates.

As FIG. 5 reveals, the test computer 64 operates in such a way that, within a loop in which the various object paths are predicted and the respective minimum distances from its own predicted path are determined, it constantly interrogates its input connected to the output of the test circuit 62 whether there is a new object data record in the test circuit 62.

Figure 6:
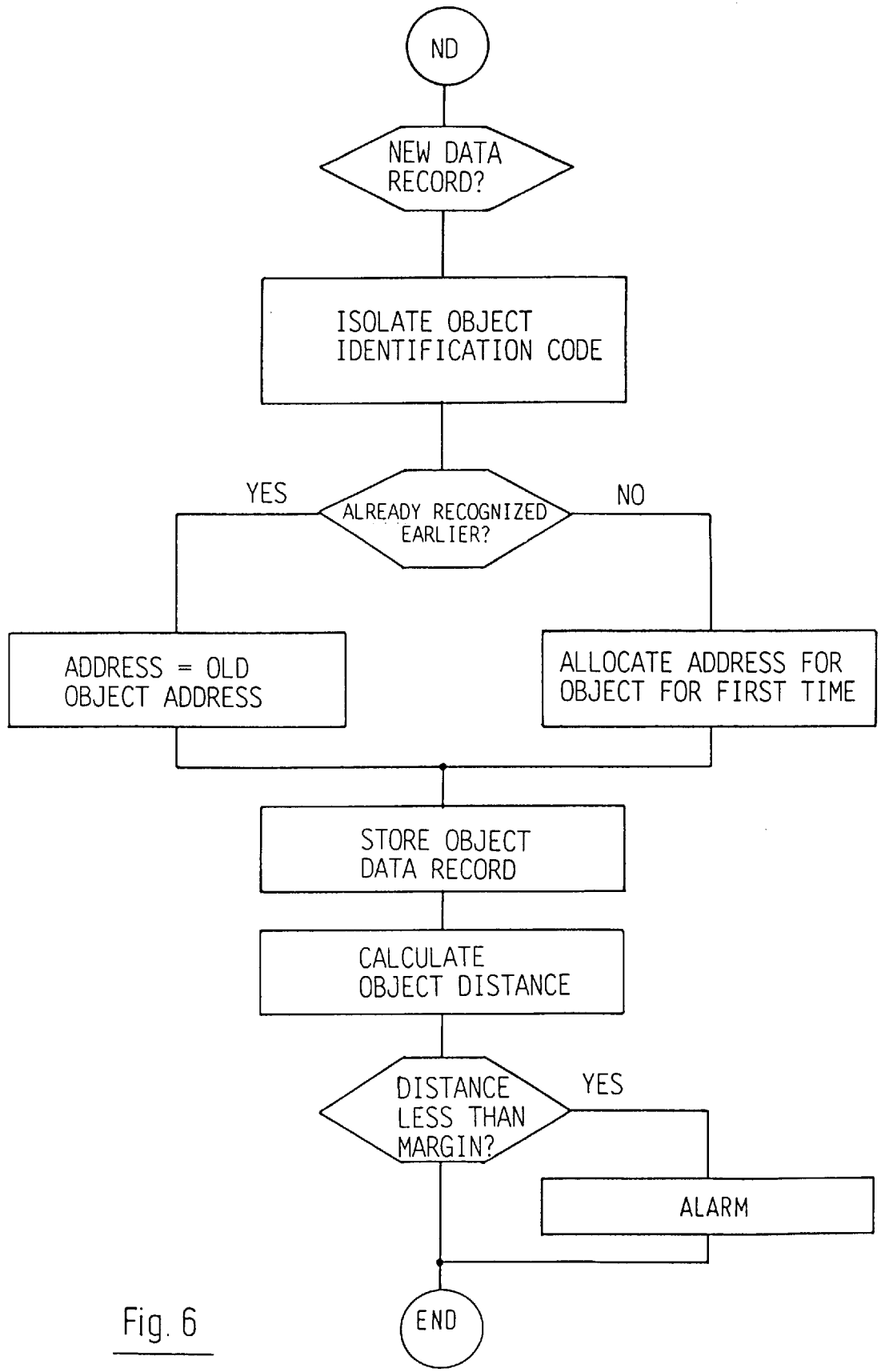
FIG. 6: a flowchart of a subroutine of the main program according to FIG. 5, which is used to read in new path data records.

If so, the computer (cf. the subroutine of FIG. 6) determines where said data record is to be filed in the object data memory 66 and whether the distance from the object associated with said data record is less than a preset safety margin. If so, the test computer 64 activates an alarm and supplies an indication to said effect as well as a proposal for an avoidance manoeuvre on a display screen 68.

If no such immediately hazardous situation exists, the test computer 64 continues to run through its main program. In it, the test computer loads the various object data records from the object data memory 66. For each object data record, the estimated distance travelled by the associated aircraft is calculated by extrapolation and compared with the course calculated by extrapolation of the aircraft's own position data and course data. The minimum distance between said two courses is determined and, if said distance is again less than a preset safety margin, this results first in activation of the alarm unit 70 and a corresponding output on the display screen 68.

Figure 7:
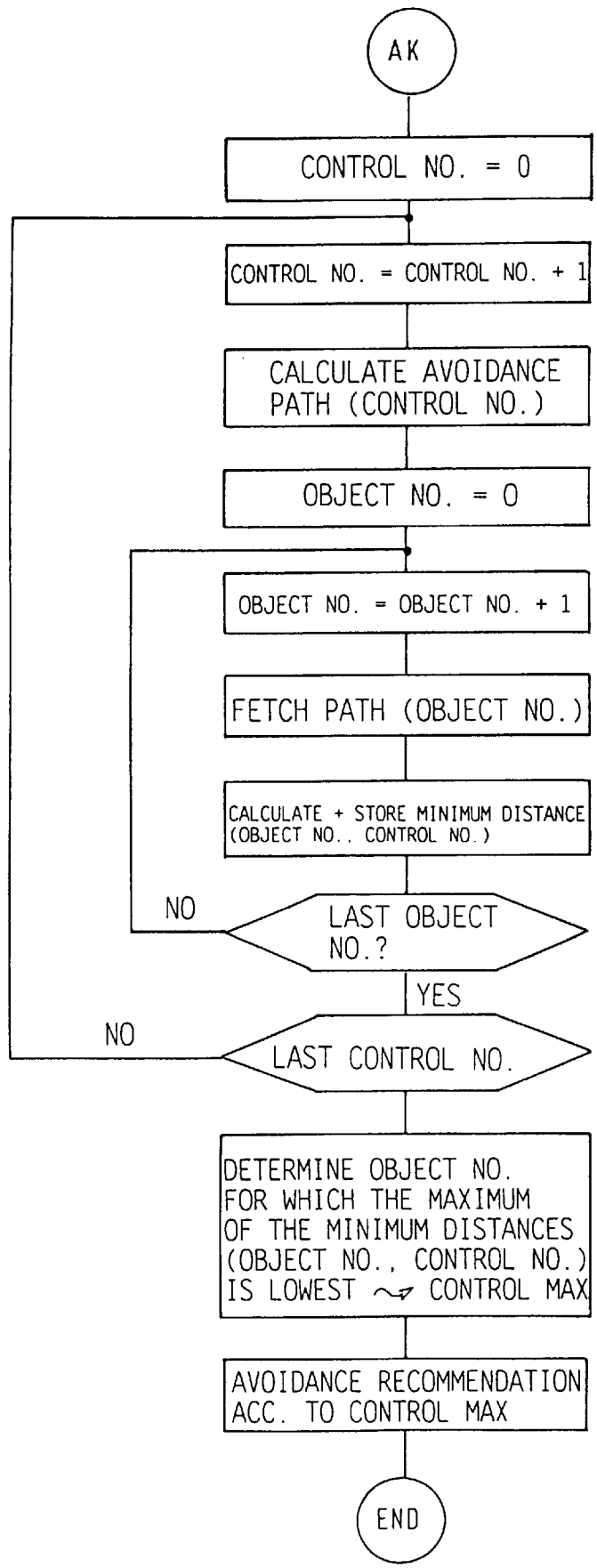
FIG. 7: a flowchart of a subroutine of the main program according to FIG. 5, which is used to determine a proposal for a change of course.

In said case, the test computer 64 simultaneously proposes a course correction which takes the customary avoidance rules into account. Furthermore, due account has already been taken in the avoidance proposal of whether the proposed change of course might lead to another object coming unacceptably close. See, in said respect, the flow-chart of the subroutine for determining the avoidance proposal which is reproduced in FIG. 7.

The above principle for monitoring the distance between various aircraft situated in a common air space may equally be translated to collision avoidance between ships.

Furthermore, the above principle may also be used to avoid collisions with stationary obstacles, e.g. mountains and tall buildings, when the objects are aircraft, or shallows and no-go areas of the sea when the objects are ships. For said purpose, the obstacles are provided with radio buoys which operate in a similar way to the active or transmitting part of a monitoring unit of the type described above with reference to FIG. 2. Since the position of the obstacle is however invariable, a corresponding object data record may simply be filed in a read-only memory 72 (cf. FIG. 3) which is connected to the input of the transmission circuit 44. Since the position of the obstacle is known and, for cost reasons, no GPS unit is provided in the radio buoy, allocation of a time slice is effected in a permanent manner, with synchronizing of the transmission control circuit 46 with real time being effected by means of a radio clock 74 which is connected to an antenna 76.

Figure 3:
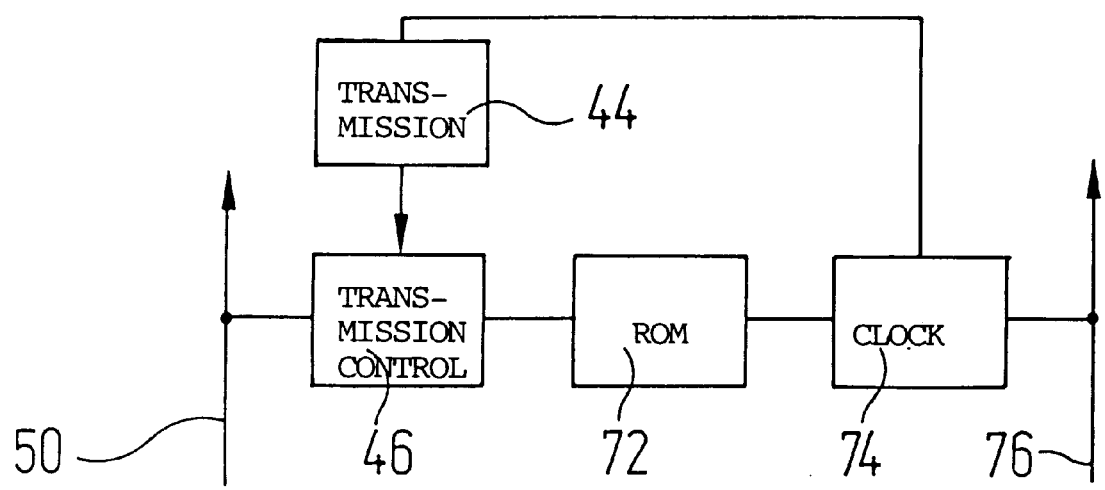
FIG. 3: a block diagram of a radio buoy, with which particular obstacles for moving objects may be identified.

It is apparent that by means of radio buoys of the type shown in FIG. 3 obstacles may be integrated at very low cost into a system for monitoring the course of moving objects which is independent of a control centre.

I claim:

1. A device for monitoring the distance between two objects (10, 12, 14), at least one of which is a moving object, having transmission units (44, 50) carried by the two objects (10, 12 14) and a receiving unit (50, 52) carried at least by the moving object (10, 12 14), the transmission units (44, 50) transmitting position data signals for the object carrying the transmission unit (10, 12, 14), and an identification signal associated with the object carrying the transmission unit and the receiving unit (50, 52) receiving the position data signals and object identification signals of the other object, wherein at least the moving object (10, 12, 14) carries a GPS unit (28) which supplies the position data signals; wherein the transmission units (44, 50) and the receiving unit (50, 52) operate in the VHF range and each comprise an antenna (50) with a substantially spherical operating characteristic, and wherein the transmission units (44, 50) have identical transmitting power and the receiving units (44, 50) are connected to a discriminator circuit (56) which rejects received signals of an amplitude below a preset threshold value, and at least the moving object (10, 12, 14) carries a monitoring computer (64) which, from the position data signals of the moving object and the received position data signals of the other object calculates the distance between the two objects (10, 12, 14).

2. A device as claimed in claim 1, wherein the transmission units (44, 50) further transmit course data signals of the object (10, 12, 14) by which they are carried and wherein the monitoring computers (64), from the position data signals and course data signals of the object in question and the received position data signals and course data signals of the other object, extrapolate the future movement of the two objects and additionally produce an alarm signal when the extrapolated paths come closer than a preset distance to one another.

3. A device as claimed in claim 1, wherein each transmission unit (44, 50) is allocated a preset transmission time slice in relation to the standard time, the standard time preferably being supplied by the GPS unit (28).

4. A device as claimed in claim 3, wherein the transmission time slice is predetermined in dependence upon a radiotelephone frequency (40) allocated in each case to the object (10, 12, 14).

5. A device as claimed in claim 3, wherein the transmission time slice is predetermined in dependence upon a registration number allocated in each case to the object (10, 12, 14).

6. A device as claimed in claim 1, wherein the monitoring computer (64) on the basis of the extrapolated paths of the two objects (10, 12, 14) proposes a change of course, by means of which a collision is avoided.

* * * * *